(12) United States Patent
Guan

(10) Patent No.: US 10,339,399 B2
(45) Date of Patent: Jul. 2, 2019

(54) DETECTION APPARATUS, DETECTION METHOD, AND COMPUTER-READABLE RECORDING MEDIUM

(71) Applicant: Haike Guan, Kanagawa (JP)

(72) Inventor: Haike Guan, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 291 days.

(21) Appl. No.: 15/337,515

(22) Filed: Oct. 28, 2016

(65) Prior Publication Data

US 2017/0120821 A1 May 4, 2017

(30) Foreign Application Priority Data

Nov. 4, 2015 (JP) ................. 2015-217024

(51) Int. Cl.
*G06K 9/00* (2006.01)
*G06K 9/46* (2006.01)

(52) U.S. Cl.
CPC ....... *G06K 9/00825* (2013.01); *G06K 9/4652* (2013.01)

(58) Field of Classification Search
None
See application file for complete search history.

(56) References Cited

U.S. PATENT DOCUMENTS

| 9,057,932 | B2 | 6/2015 | Guan |
| 9,336,606 | B2 | 5/2016 | Guan et al. |
| 2008/0187318 | A1* | 8/2008 | Osanai ............... H04B 10/1141 398/129 |
| 2012/0313770 | A1* | 12/2012 | Zeiger .................... B60K 35/00 340/441 |
| 2013/0322692 | A1 | 12/2013 | Guan |
| 2014/0098196 | A1 | 4/2014 | Guan |
| 2014/0133699 | A1 | 5/2014 | Guan |
| 2014/0254872 | A1 | 9/2014 | Guan |
| 2015/0124096 | A1* | 5/2015 | Koravadi ........... G06K 9/00825 348/148 |
| 2015/0166062 | A1* | 6/2015 | Johnson ................ B60W 30/12 701/41 |
| 2015/0210312 | A1* | 7/2015 | Stein ..................... B60W 30/00 701/41 |
| 2015/0334506 | A1* | 11/2015 | Rao ........................ G06Q 50/01 455/414.1 |
| 2016/0035122 | A1* | 2/2016 | Stewart ................... G06T 13/80 345/473 |

(Continued)

FOREIGN PATENT DOCUMENTS

| JP | 5627369 | 10/2014 |
| JP | 2016-103201 | 6/2016 |
| JP | 2016-161973 A | 9/2016 |

*Primary Examiner* — Xiaolan Xu
(74) *Attorney, Agent, or Firm* — Oblon, McClelland, Maier & Neustadt, L.L.P.

(57) ABSTRACT

A detection apparatus includes a camera, a recognizer, and a first detector. The camera is configured to acquire image data around a vehicle. The recognizer is configured to recognize an area indicating a light of a traffic signal from the image data. The first detector is configured to detect that the vehicle runs through the light when a size of the area indicating the light is larger than a first threshold, a distance between the area indicating the light and an end of the image data is shorter than a second threshold, and velocity data of the vehicle is higher than a third threshold.

8 Claims, 9 Drawing Sheets

(56) References Cited

U.S. PATENT DOCUMENTS

| | | |
|---|---|---|
| 2016/0156881 A1 | 6/2016 | Guan et al. |
| 2016/0227104 A1 | 8/2016 | Guan et al. |
| 2017/0028911 A1* | 2/2017 | Medenica ................ B60Q 9/00 |
| 2017/0061544 A1* | 3/2017 | McClain ................ G06Q 40/08 |
| 2017/0313297 A1* | 11/2017 | Okada ...................... G08G 1/09 |

* cited by examiner

DETECTION APPARATUS, DETECTION METHOD, AND COMPUTER-READABLE RECORDING MEDIUM

CROSS-REFERENCE TO RELATED APPLICATION

The present application claims priority under 35 U.S.C. § 119 to Japanese Patent Application No. 2015-217024, filed Nov. 4, 2015. The contents of which are incorporated herein by reference in their entirety.

BACKGROUND OF THE INVENTION

1. Field of the Invention

The present invention relates to a detection apparatus, a detection method, and a computer-readable recording medium.

2. Description of the Related Art

When a driver ignores a light of a traffic signal in driving a vehicle, there arises a high possibility of causing a traffic accident. A technique of detecting a dangerous driving in which a light of a traffic signal is ignored and alerting a driver has been known conventionally. It is possible to support a driver's habit formation for safe driving by detecting ignoring, intentionally or negligently, of a light of a traffic signal as a dangerous driving and alerting the driver to the dangerous driving. For this purpose, a technique of detecting, with high accuracy, a dangerous driving in which a signal is ignored has been demanded.

Japanese Patent No. 5627369 discloses an invention of an in-vehicle driving recorder which is capable of surely recording data indicating a state in which the possibility that a driver ignored a light of a traffic signal is high, suppressing a recording of useless data, and easily extracting data of high importance related to the ignoring of the light.

However, it is necessary in the conventional technique to receive external information indicating a condition of light from the traffic signal and there is a problem that a performance in detecting the dangerous driving in which the light is ignored deteriorates significantly without the external information.

SUMMARY OF THE INVENTION

According to one aspect of the present invention, a detection apparatus includes a camera, a recognizer, and a first detector. The camera is configured to acquire image data around a vehicle. The recognizer is configured to recognize an area indicating a light of a traffic signal from the image data. The first detector is configured to detect that the vehicle runs through the light when a size of the area indicating the light is larger than a first threshold, a distance between the area indicating the light and an end of the image data is shorter than a second threshold, and velocity data of the vehicle is higher than a third threshold.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
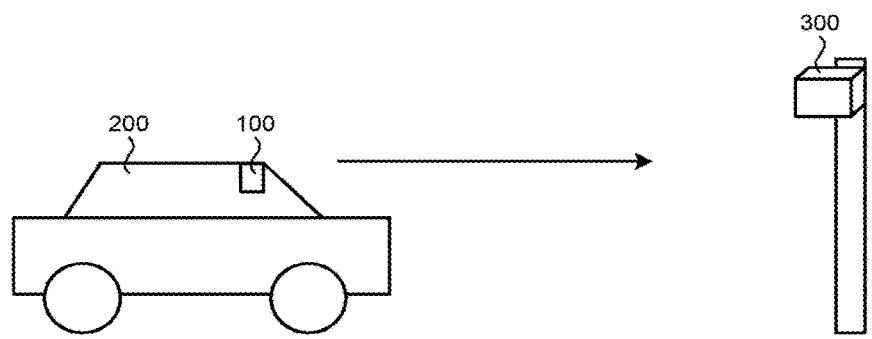
FIG. 1 illustrates an example of a vehicle in which a detection apparatus according to an embodiment is mounted.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide a detection apparatus, a detection method, and a computer-readable recording medium capable of detecting, with higher accuracy, a dangerous driving in which a signal is ignored with simpler configuration.

FIG. 1 illustrates an example of a vehicle 200 in which a detection apparatus 100 according to an embodiment is mounted. The detection apparatus 100 according to the embodiment is arranged in the vicinity of a rearview mirror of a windshield of the vehicle 200. In an explanation of the detection apparatus 100 according to the embodiment, a case of a detection as a dangerous driving when a driver of the vehicle 200 ignores a red light and the vehicle 200 runs through the red light will be explained.

Figure 2:
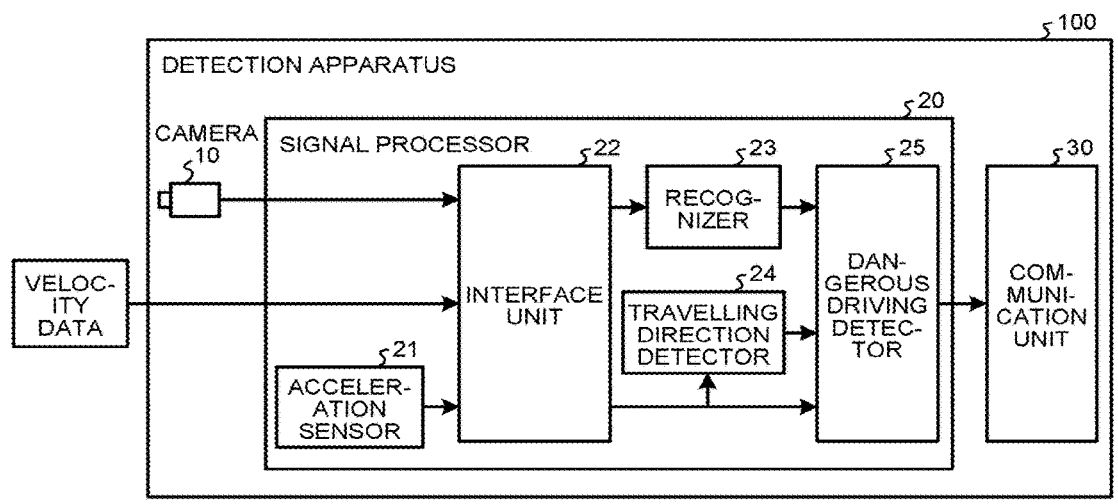
FIG. 2 illustrates an example of a configuration of the detection apparatus according to the embodiment.

FIG. 2 illustrates an example of a configuration of the detection apparatus 100 according to the embodiment. The detection apparatus 100 according to the embodiment is provided with a camera 10, a signal processor 20, and a communication unit 30. The signal processor 20 is provided with an acceleration sensor 21, an interface unit 22, a recognizer 23, a travelling direction detector 24, and a dangerous driving detector 25.

The camera 10 captures images around the vehicle 200 to obtain color image data. The camera 10 inputs the image data to the interface unit 22.

The acceleration sensor 21 obtains acceleration data of the vehicle 200. The acceleration data includes acceleration (positive value) of the vehicle 200 when an accelerator pedal of the vehicle 200 is pushed down by a driver and acceleration (negative value) of the vehicle 200 when a brake pedal of the vehicle 200 is pushed by the driver, for example. The acceleration sensor 21 inputs the acceleration data to the interface unit 22.

When receiving the image data from the camera 10, the interface unit 22 converts the image data into a data format that can be received by the recognizer 23 as time-series successive image frames.

When receiving velocity data that indicates a velocity of the vehicle 200 via an in-vehicle network such as CAN (Controller Area Network) from other devices of the vehicle 200, the interface unit 22 inputs the velocity data to the dangerous driving detector 25.

When receiving the acceleration data that indicates the acceleration of the vehicle 200 from the acceleration sensor 21, the interface unit 22 converts the acceleration data into a data format that can be received by the travelling direction detector 24 and the dangerous driving detector 25. The interface unit 22 then inputs the acceleration data whose data format is converted to the travelling direction detector 24 and the dangerous driving detector 25.

When receiving the image data from the interface unit 22, the recognizer 23 recognizes an area indicating a red light of a traffic signal 300 from the image data.

Figure 3:
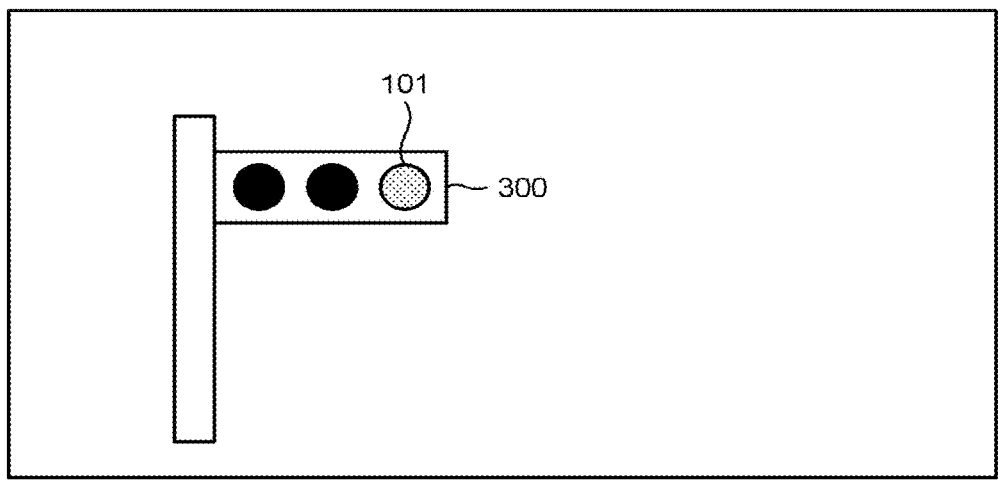
FIG. 3 illustrates an example of captured image data of a traffic signal.

FIG. 3 illustrates an example of captured image data of the traffic signal 300. FIG. 3, which illustrates an example of captured image data of the traffic signal 300 that indicates a red light, includes a red light area 101 of the traffic signal 300. The recognizer 23 recognizes the red light area 101 of the traffic signal 300 by a light recognition processing to be explained later.

With reference to FIG. 2 again, the light recognition processing in which the recognizer 23 recognizes the red light area 101 of the traffic signal 300 will be explained specifically.

First, the recognizer 23 uses the following Equation (1) to convert image data of (R, G, B) color space into image data of (Y, U, V) color space.

$$\begin{bmatrix} Y \\ U \\ V \end{bmatrix} = \begin{bmatrix} 0.299 & 0.587 & 0.114 \\ -0.147 & -0.289 & 0.436 \\ 0.615 & -0.515 & 0.100 \end{bmatrix} \begin{bmatrix} R \\ G \\ B \end{bmatrix} \quad (1)$$

Next, the recognizer 23 performs an extraction processing in which an area of red light pixels is extracted from the image data of the (Y, U, V) color space based on (U, V) distribution of the red light pixels and the image data of the (Y, U, V) color space. Here, an example of the (U, V) distribution of the red light pixels will be explained.

Figure 4:
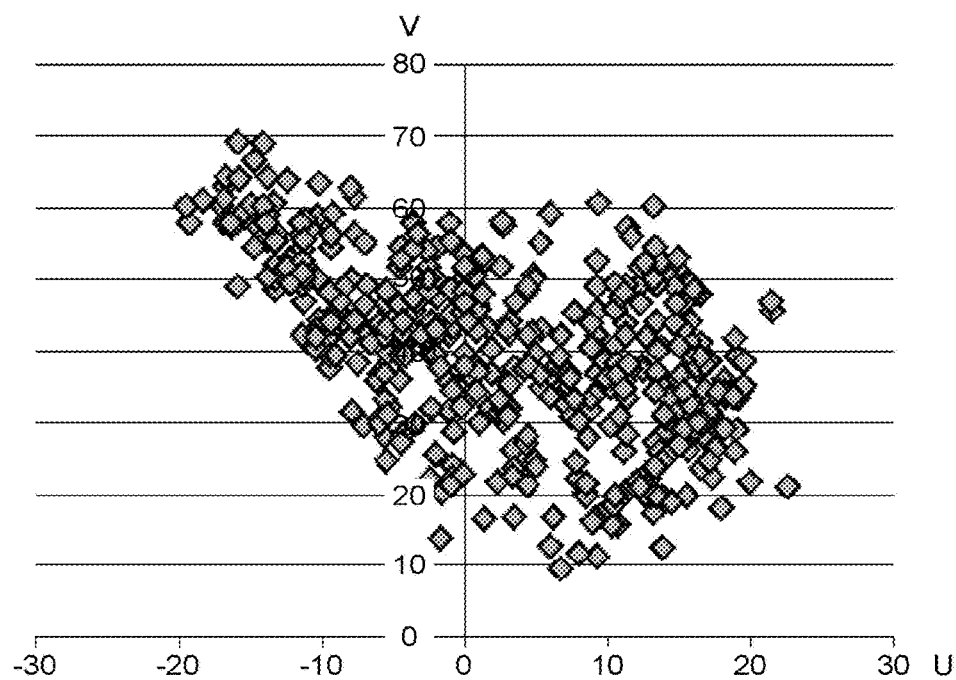
FIG. 4 illustrates an example of (U, V) distribution of red light pixels.

FIG. 4 illustrates an example of the (U, V) distribution of the red light pixels. The example in FIG. 4 indicates (U, V) distribution of red light pixels obtained from pixel data of the (R, G, B) color space of a plurality of image samples capturing a red light.

With reference to FIG. 2 again, to explain specifically, the recognizer 23 judges, with respect to the (U, V) distribution illustrated in FIG. 4, whether or not a (U, V) value of the image data of the (Y, U, V) color space is included in a range between predetermined thresholds (U-min and U-max) for U and thresholds (V-min and V-max) for V. The recognizer 23 next extracts, from the image data, pixels of the image data of the (Y, U, V) color space included in the range of the thresholds as the area of red light pixels.

Specific values for the thresholds (U-min and U-max) for U and the thresholds (V-min and V-max) for V may be arbitrarily determined. However, since the possibility of detecting a pixel which is not the red light becomes high when the range of the thresholds is too wide, the thresholds are set so as to eliminate overlap with the (U, V) value of the pixel which is not the red light.

Figure 5:
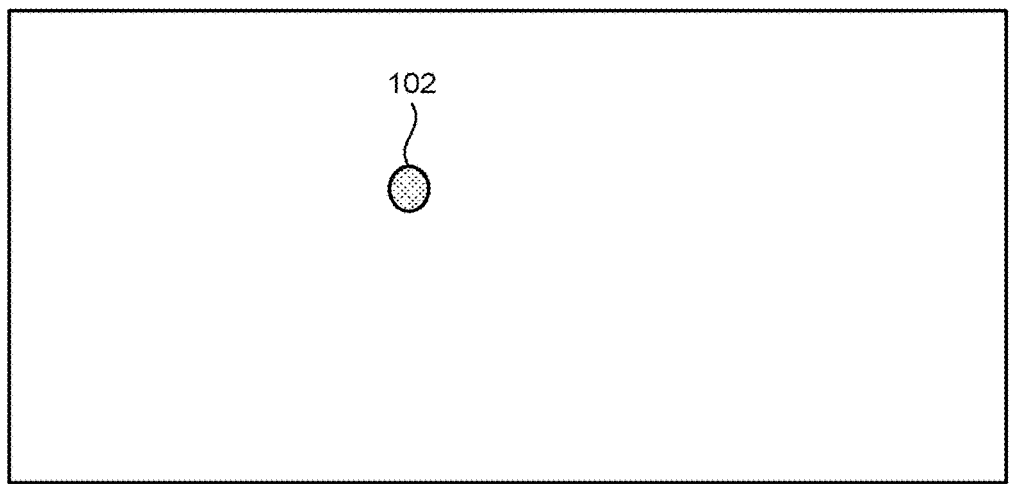
FIG. 5 illustrates an example of an area of red light pixels extracted by a recognizer according to the embodiment.

FIG. 5 illustrates an example of a red light pixel area 102 extracted by the recognizer 23 according to the embodiment. The size of the red light pixel area 102 in FIG. 5 is smaller than the size of the area 101 indicating an actual red light. That is to say, the example in FIG. 5 illustrates a situation where an area that should normally be extracted as the red light area 101 is not extracted due to an influence by a noise pixel.

The noise pixel here includes a noise pixel attributed to a surrounding condition in capturing images, a noise pixel attributed to characteristics of an imaging element, a noise pixel attributed to a dust attached onto a front surface of the imaging element, and the like. The noise pixel attributed to the surrounding condition in capturing images is a pixel of an area in which a reflection due to a light such as the sun light, for example, is present when the image of the traffic signal 300 is captured by the camera 10. The noise pixel attributed to the characteristics of the imaging element is a pixel which is influenced by a random noise, for example.

With reference to FIG. 2 again, the recognizer 23 next performs an expansion processing in which the red light pixel area 102 is expanded. Specifically, the recognizer 23 covers each of the pixels included in the red light pixel area 102 with a plurality of pixels to expand the red light pixel area 102 into an expanded pixel area. The recognizer 23 convers each pixel with "n×n" block pixels ("n" is an integer equal to or more than one), for example. In a case of "n=7", for example, each pixel included in the red light pixel area 102 is expanded into an area further including 48 (7×7−1) pixels around the pixel to expand the red light pixel area 102 into the expanded pixel area.

Figure 6:
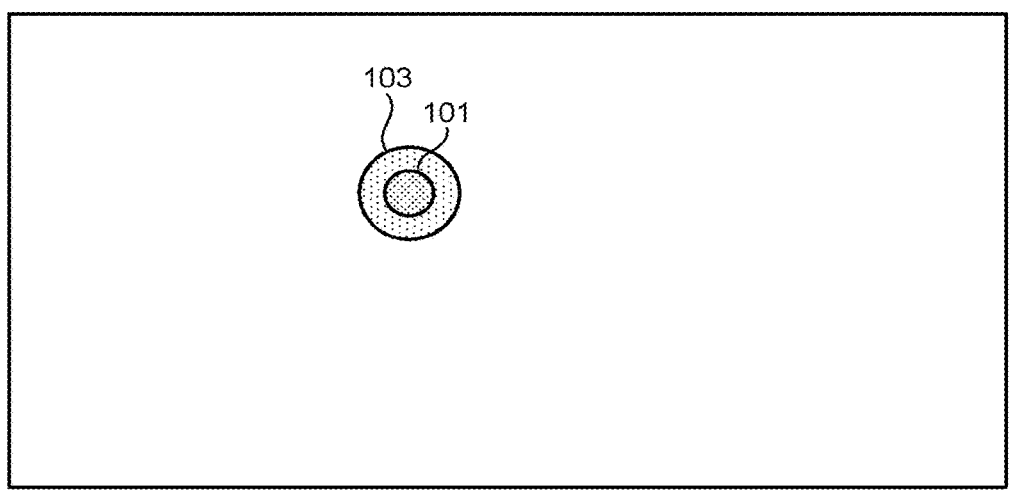
FIG. 6 illustrates an example of an expanded pixel area obtained by the recognizer according to the embodiment.

FIG. 6 illustrates an example of an expanded pixel area 103 obtained by the recognizer 23 according to the embodiment. The example in FIG. 6 illustrates a case where the expanded pixel area 103 including the red light area 101 is obtained through the expansion processing performed on the extracted red light pixel area 102.

With reference to FIG. 2 again, the recognizer 23 next performs a shape recognition processing in which a shape of the red light area 101 is recognized. Specifically, the recognizer 23 performs the Hough transform of the extracted red light pixel area 102 to judge whether or not a circular pixel area can be extracted in the expanded pixel area 103. When a circular pixel area can be extracted, the recognizer 23 recognizes that the circular pixel area is the red light area 101 of the traffic signal 300. The recognizer 23 then calculates a circumscribed rectangular area of the circular pixel area and generates recognition data indicating the rectangular area as a recognition result area.

Figure 7:
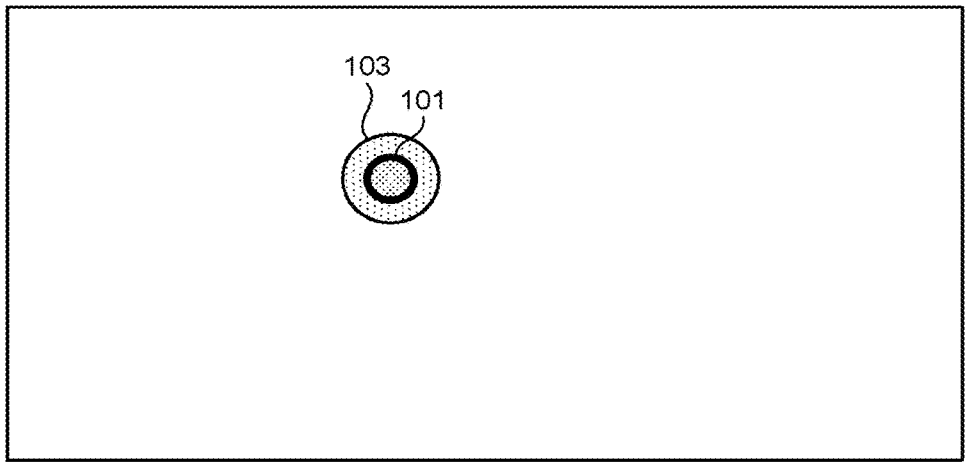
FIG. 7 illustrates an example of a circular pixel area which is extracted via Hough transform by the recognizer according to the embodiment.

FIG. 7 illustrates an example of a circular pixel area which is extracted via the Hough transform by the recognizer 23 according to the embodiment. The example in FIG. 7 illustrates a case where the red light area 101 is extracted as a circular pixel area through the Hough transform performed on the red light pixel area 102 (see FIG. 5).

Figure 8:
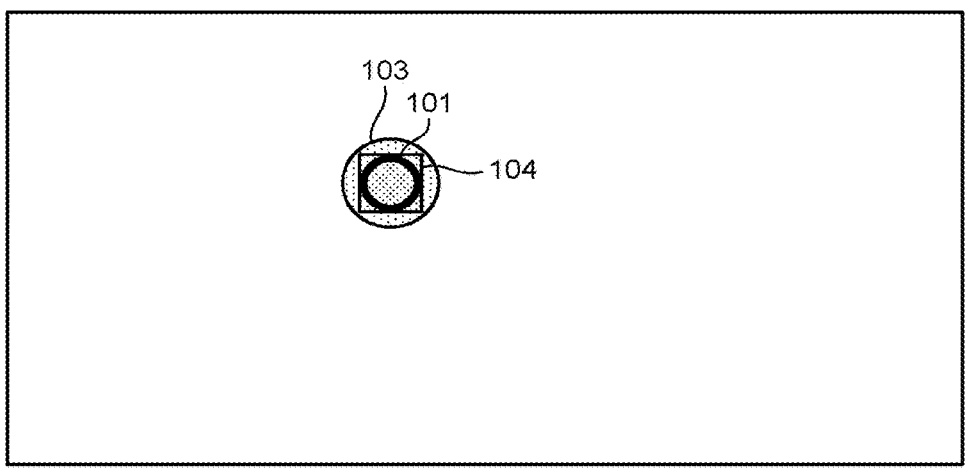
FIG. 8 illustrates an example of a recognition result area obtained by the recognizer according to the embodiment.

FIG. 8 illustrates an example of the recognition result area 104 obtained by the recognizer 23 according to the embodiment. The example in FIG. 8 illustrates a case where the recognition result area 104 is recognized as a circumscribed rectangle of the red light area 101 extracted as a circular pixel area.

Figure 9:
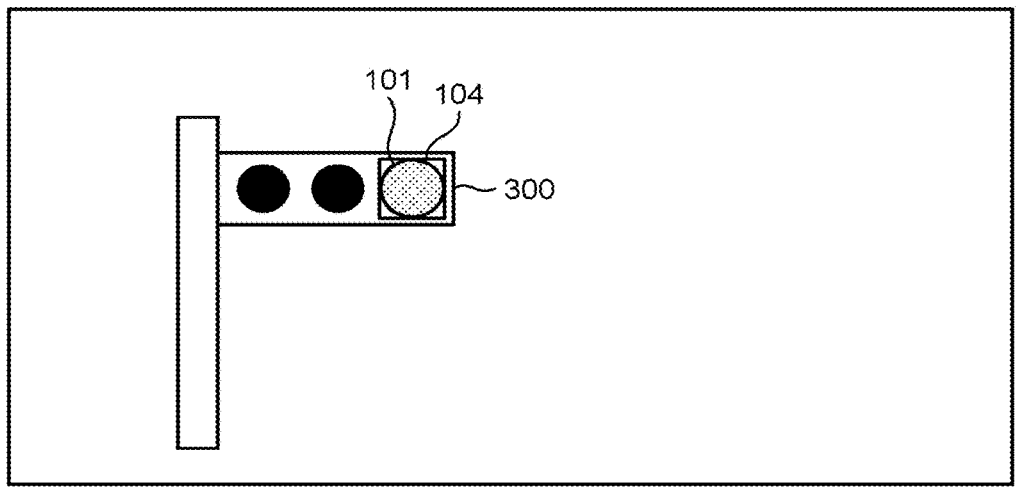
FIG. 9 illustrates an example of the recognition result area recognized by the recognizer according to the embodiment.

FIG. 9 illustrates an example of the recognition result area 104 recognized by the recognizer 23 according to the embodiment. The example in FIG. 9 illustrates a case where the red light area 101, included in the image data illustrated in FIG. 3, of the traffic signal 300 is recognized as the recognition result area 104 including the red light area 101.

Here, the recognizer 23 is capable of recognizing, for example, an area indicating a green light, an area indicating a yellow light, and the like in the same method as the light recognition processing in which the red light area 101 is recognized.

With reference to FIG. 2 again, the recognizer 23 recognizes an arrow light (see FIG. 11 to be explained later) of the traffic signal 300. Here, an arbitrary method may be adopted for recognizing the arrow light. When the number of green color pixels indicating the color of the arrow light is equal to or more than a threshold, for example, in an area peripheral to the area in which the green light, the yellow light, and the red light of the traffic signal 300 are lit and the area constituted by the green color pixels represents an arrow shape, the recognizer 23 recognizes that an arrow light is displayed in the peripheral area.

The recognizer 23 inputs recognition result information that indicates a result of the recognition to the dangerous driving detector 25. The recognition result information at least includes the recognition result area 104. The recognition result information further includes arrow information that indicates a direction of the arrow light when recognizer 23 recognizes the arrow light.

When receiving the acceleration data from the interface unit 22, the travelling direction detector 24 detects a travelling direction of the vehicle 200 based on the acceleration data. The travelling direction detector 24 inputs travelling direction information that indicates the travelling direction of the vehicle 200 to the dangerous driving detector 25.

The dangerous driving detector 25 receives the velocity data and the acceleration data from the interface unit 22. The dangerous driving detector 25 also receives the recognition result information from the recognizer 23. The dangerous driving detector 25 also receives the travelling direction information from the travelling direction detector 24.

The dangerous driving detector 25 performs a dangerous driving detection processing in which a dangerous driving in which a red light is run through is detected. Here, an example of the dangerous driving detection processing by the dangerous driving detector 25 will be explained. Table 1 illustrates judgement condition examples for dangerous driving detection.

TABLE 1

| Judgement condition | Width of recognition result area | Distance from upper end | Velocity | Acceleration | Arrow light | Travelling direction |
|---|---|---|---|---|---|---|
| 1 | W > threW | Y < threY | V > threV | — | No | — |
| 2 | W > threW | Y < threY | V ≤ threV | G > threG | No | — |
| 3 | W > threW | Y < threY | V > threV | — | Yes | Not match |
| 4 | W > threW | Y < threY | V ≤ threV | G > threG | Yes | Not match |

First, a judgement condition 1 will be explained. The judgement condition 1 is for judging a case where the vehicle 200 runs through a red light of the traffic signal 300 without arrow lights at a velocity higher than a predetermined velocity. In other words, the vehicle 200 is judged as a vehicle whose driver ignored and ran through the red light for passing judgement.

Figure 10:
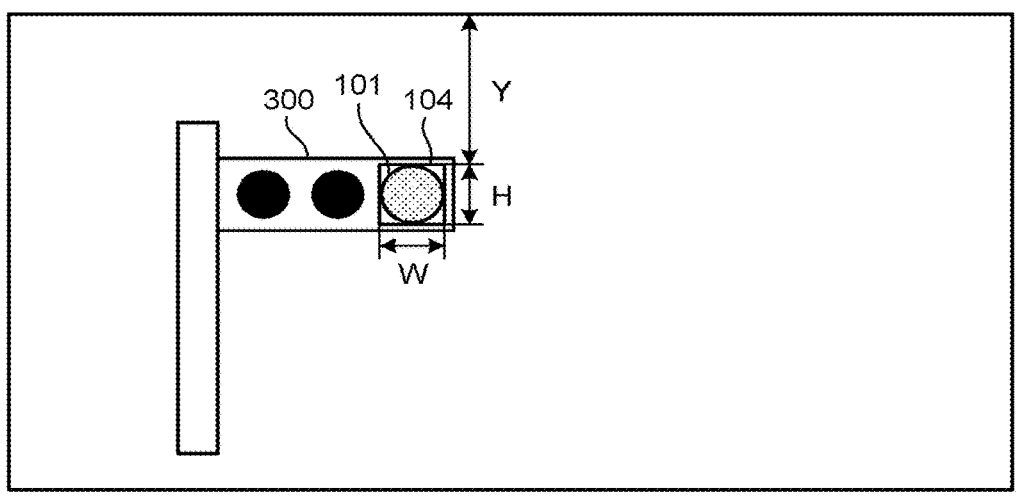
FIG. 10 is an explanatory view of an example of a detection processing (in a case where an arrow light is not present) according to the embodiment.

FIG. 10 is an explanatory view of an example of a detection method (in the case where an arrow light is not present) according to the embodiment. The symbol "H" indicates a height of the recognition result area 104. The symbol "W" indicates a width of the recognition result area 104. The symbol "Y" indicates a distance between the recognition result area 104 included in the image data and an upper end of the image data.

Since the vehicle 200 comes closer to the traffic signal 300 when ignoring and running through the red light, the width W of the recognition result area 104 including the red light area 101 becomes large. On this occasion, the distance Y between the recognition result area 104 included in the image data and the upper end of the image data becomes short. Therefore, when the vehicle 200 ignores and runs through the red light of the traffic signal 300, the following Expressions (2) and (3) are to be true. Here, symbols the "threW" and "threY" indicate respective predetermined thresholds.

$$W > threW \tag{2}$$

$$Y < threY \tag{3}$$

When the vehicle 200 ignores and runs through the red light of the traffic signal 300 at a velocity higher than the predetermined velocity, the following Expression (4) is to be true.

$$V > threV \tag{4}$$

When the judgement condition 1 in Table 1 is satisfied, the dangerous driving detector 25 detects that the vehicle 200 runs through the red light. In other words, the dangerous driving detector 25 detects that the vehicle 200 runs through the red light when the size of the recognition result area 104 including the red light area 101 is larger than threW, the distance Y between the recognition result area 104 including the red light area 101 and the upper end of the image data is shorter than threY, and the velocity data of the vehicle 200 is higher than threV.

Next, a judgement condition 2 will be explained. The judgement condition 2 is for judging a case where a driver pushes down the accelerator pedal in the vicinity of the traffic signal 300 whose red light is lit though the velocity V of the vehicle 200 is low. The judgement condition 2 allows judging a case where the vehicle 200 ignores and runs through the red light as a result of acceleration before the red light turns to the green light, for example.

When the vehicle 200 ignores and runs through the red light of the traffic signal 300 with acceleration higher than a predetermined acceleration, the following Expression (5) is to be true. Here, the symbol "G" indicates the acceleration of the vehicle 200. The symbol "threG" indicates the predetermined threshold. The acceleration sensor 21 detects acceleration indicating a speed-up when the accelerator pedal is pushed down as a positive value and detects acceleration indicating a slow-down when the brake pedal is pushed down as a negative value.

$$G > threG \quad (5)$$

Therefore, the dangerous driving detector 25 detects that the vehicle 200 runs through the red light when the judgement condition 2 in Table 1 is satisfied. In other words, the dangerous driving detector 25 detects that the vehicle 200 runs through the red light when the size of the recognition result area 104 including the red light area 101 is larger than threW, the distance Y between the recognition result area 104 including the red light area 101 and the upper end of the image data is shorter than threY, the velocity data of the vehicle 200 is not higher than threV, and the acceleration data of the vehicle 200 is higher than threG.

Next, a judgement condition 3 will be explained. The judgement condition 3 is for judging that a driver of the vehicle ignores and runs through the red light under a red light of the traffic signal 300 with an arrow light.

Figure 11:
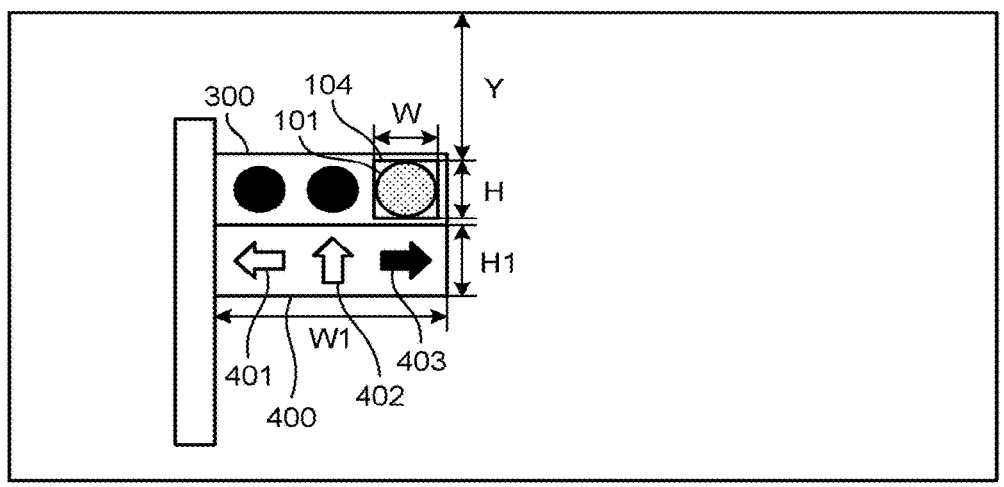
FIG. 11 is an explanatory view of an example of a detection processing (in a case where an arrow light is present) according to the embodiment.

FIG. 11 is an explanatory view of an example of a detection processing (in a case where an arrow light is present) according to the embodiment. The explanation for the height H, the width W, and the distance Y is the same as that in FIG. 10 and the same explanation will be omitted here. The symbol "H1" indicates a height of a peripheral area 400 in which arrow lights 401, 402, and 403 are displayed. The symbol "W1" indicates a width of the peripheral area 400 in which the arrow lights 401, 402, and 403 are displayed.

When the arrow light 401 is displayed, the vehicle 200 is allowed to turn left even when the traffic signal 300 indicates the red light. When the arrow light 402 is displayed, the vehicle 200 is allowed to go straight even when the traffic signal 300 indicates the red light. When the arrow light 403 is displayed, the vehicle 200 is allowed to turn right even when the traffic signal 300 indicates the red light. Since the arrow lights 401 and 402 are displayed in the example in FIG. 11, the vehicle 200 is allowed to turn left or go straight even when the traffic signal 300 indicates the red light.

Therefore, the dangerous driving detector 25 detects that the vehicle 200 runs through the red light when the judgement condition 3 in Table 1 is satisfied. In other words, the dangerous driving detector 25 detects that the vehicle 200 runs through the red light when the size of the recognition result area 104 including the red light area 101 is larger than threW, the distance Y between the recognition result area 104 including the red light area 101 and the upper end of the image data is shorter than threY, the velocity data of the vehicle 200 is higher than threV, and the direction of the arrow light indicated by arrow information does not match the travelling direction, indicated by the travelling direction information, of the vehicle 200.

Besides, the dangerous driving detector 25 detects that the vehicle 200 runs through the red light when the judgement condition 4 in Table 1 is satisfied. In other words, the dangerous driving detector 25 detects that the vehicle 200 runs through the red light when the size of the recognition result area 104 including the red light area 101 is larger than threW, the distance Y between the recognition result area 104 including the red light area 101 and the upper end of the image data is shorter than threY, the velocity data of the vehicle 200 is not higher than threV, the acceleration data of the vehicle 200 is higher than threG, and the direction of the arrow light does not match the travelling direction of the vehicle 200.

While the distance Y is configured to be the distance between the recognition result area 104 including the red light area 101 and the upper end of the image data in the above explanation, the distance Y may be determined by using, for an end of the image data, a lower end, a right end, a left end, and the like of the image data.

While the case of determining the size of the recognition result area 104 including the red light area 101 by the width W is explained in the above explanation, the size of the recognition result area 104 including the red light area 101 may be determined by the height H and the like.

With reference to FIG. 2 again, the dangerous driving detector 25 inputs detection information indicating that the dangerous driving in which the red light is run through is detected to the communication unit 30 when the dangerous driving in which the red light is run through is detected.

When receiving the detection information from the dangerous driving detector 25, the communication unit 30 transmits the detection information to other devices. The other devices include, for example, a speaker, and a server device connected via a network of the vehicle 200. The speaker of the vehicle 200, for example, outputs a warning tone based on the detection information when receiving the detection information. When receiving the detection information, the server device stores the detection information for each driver as information indicating a driving habit of the driver, for example.

Next, an example of a detection method according to the embodiment will be explained.

Figure 12:
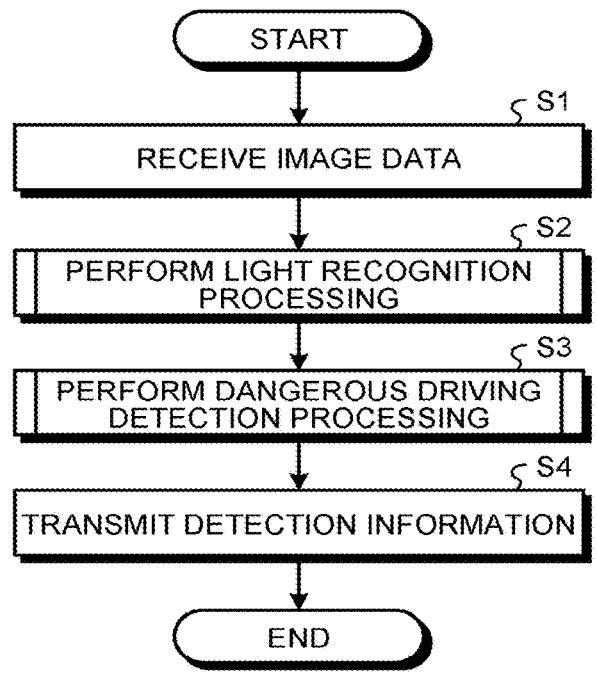
FIG. 12 is a flowchart of an outline of a detection method according to the embodiment.

FIG. 12 is a flowchart of an outline of a detection method according to the embodiment. First of all, the recognizer 23 receives, from the interface unit 22, the image data obtained by the camera 10 (step S1).

Next, the recognizer 23 performs the light recognition processing (step S2). The light recognition processing will be explained with reference to FIG. 13 later.

Next, the dangerous driving detector 25 performs the dangerous driving detection processing (step S3). The dangerous driving detection processing will be explained with reference to FIG. 14 later.

Next, the communication unit 30 transmits the detection information detected in the processing at step S3 to other devices such as the speaker and the server device (step S4).

The light recognition processing at step S2 will next be explained.

Figure 13:
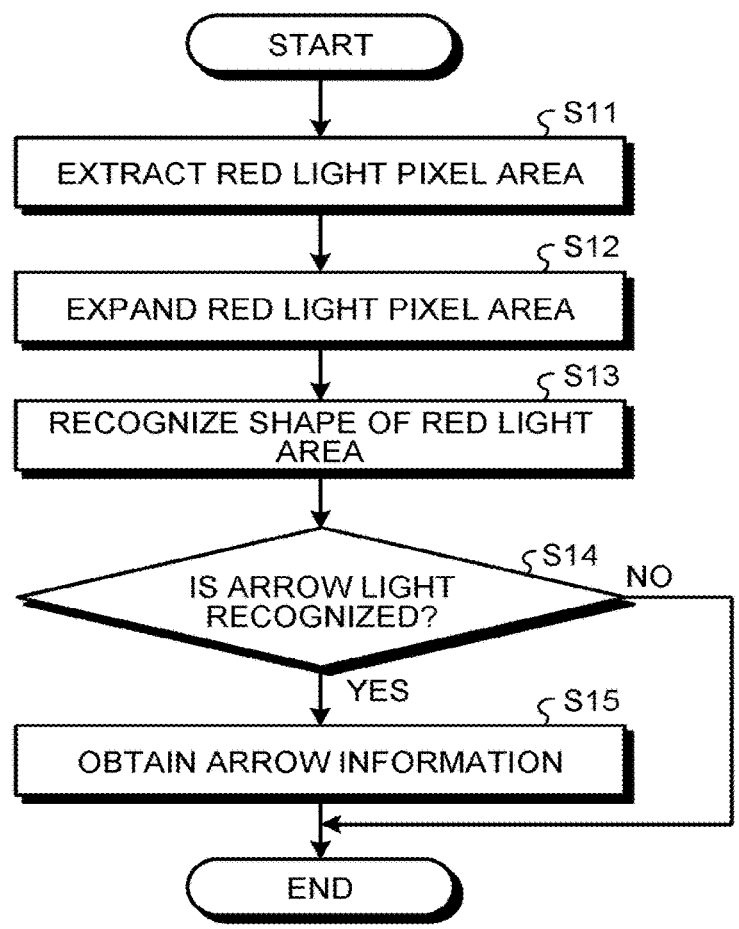
FIG. 13 is a flowchart of an example of a light recognition processing according to the embodiment.

FIG. 13 is a flowchart of an example of the light recognition processing according to the embodiment. First, the recognizer 23 performs the extraction processing in which the red light pixel area 102 is extracted from the (Y, U, V) color space based on the (U, V) distribution of red light pixels and the image data of the (Y, U, V) color space (step S11).

Next, the recognizer 23 performs the expansion processing in which the red light pixel area 102 is expanded (step S12). Next, the recognizer 23 performs the shape recognition processing in which the shape of the red light area 101 is recognized (step S13).

Next, the recognizer 23 judges whether or not an arrow light can be recognized from the image data (step S14). When the arrow light can be recognized ("Yes" at step S14), the recognizer 23 obtains arrow information indicating the direction of the arrow light (step S15). When the arrow light cannot be recognized ("No" at step S14), the light recognition processing is ended.

Next, an example of the dangerous driving detection processing at step S3 will be explained.

Figure 14:
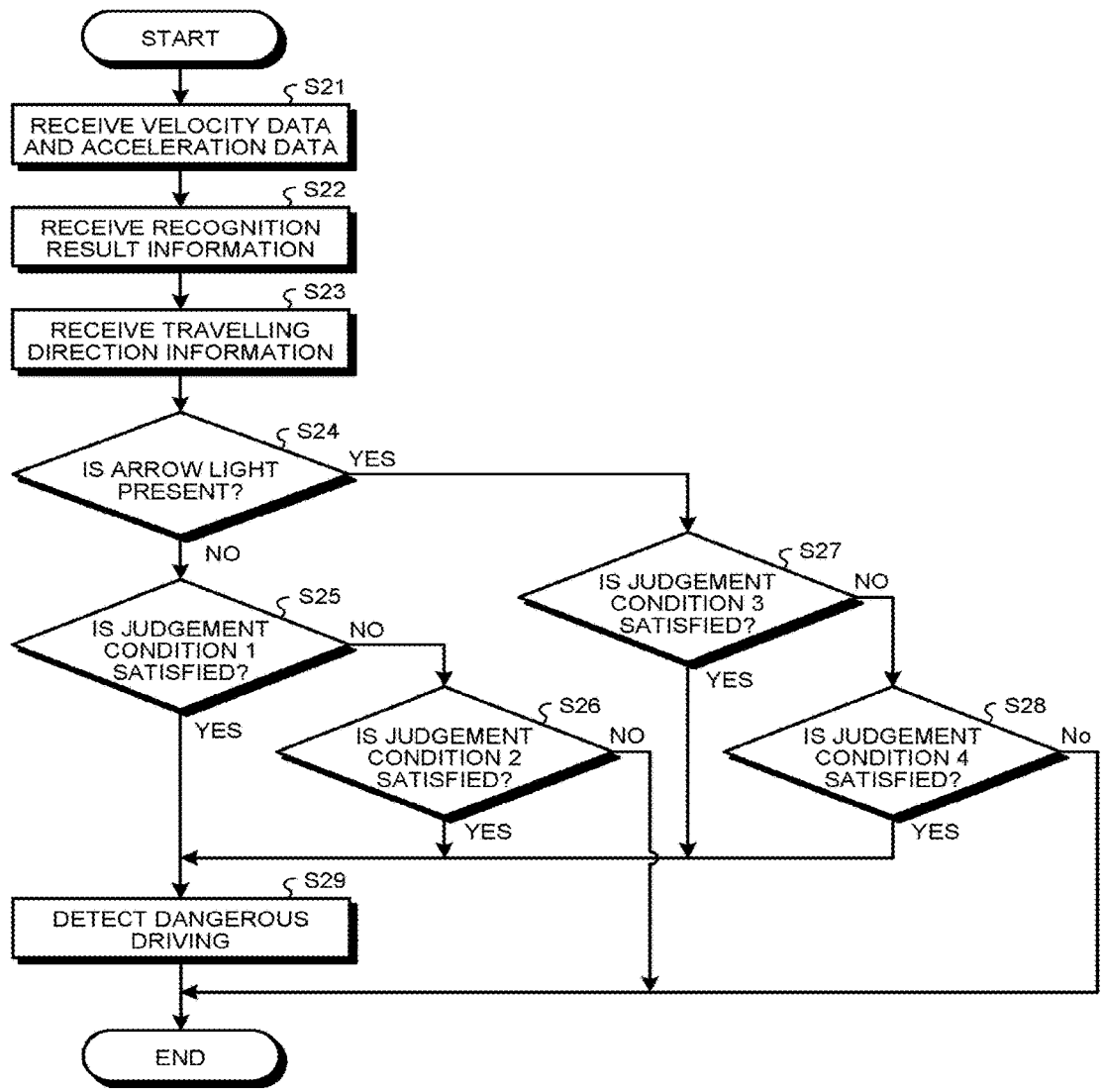
FIG. 14 is a flowchart of an example of a dangerous driving detection processing according to the embodiment.

FIG. 14 is a flowchart of an example of the dangerous driving detection processing according to the embodiment. First, the dangerous driving detector 25 receives the velocity data and the acceleration data from the interface unit 22 (step S21). Next, the dangerous driving detector 25 receives the recognition result information from the recognizer 23 (step S22). Next, the dangerous driving detector 25 receives the travelling direction information from the travelling direction detector 24 (step S23).

Next, the dangerous driving detector 25 judges whether or not an arrow light is present in the traffic signal 300 (step S24). Specifically, the dangerous driving detector 25 judges whether or not arrow information is included in the recognition result information.

When the arrow light is not present ("No" at step S24), the dangerous driving detector 25 judges whether or not the judgement condition 1 (see Table 1) is satisfied (step S25). When the judgement condition 1 is satisfied ("Yes" at step S25), the dangerous driving detector 25 detects that the driver of the vehicle 200 performed a dangerous driving by ignoring and running through the red light (step S29).

When the judgement condition 1 is not satisfied ("No" at step S25), the dangerous driving detector 25 judges whether or not the judgement condition 2 (see Table 1) is satisfied (step S26). When the judgement condition 2 is satisfied ("Yes" at step S26), the dangerous driving detector 25 detects that the driver of the vehicle 200 performed a dangerous driving by running through the red light (step S29). When the judgement condition 2 is not satisfied ("No" at step S26), the dangerous driving detection processing is ended.

When the arrow light is present ("Yes" at step S24), the dangerous driving detector 25 judges whether or not the judgement condition 3 (see Table 1) is satisfied (step S27). When the judgement condition 3 is satisfied ("Yes" at step S27), the dangerous driving detector 25 detects that the driver of the vehicle 200 performed a dangerous driving by running through the red light (step S29).

When the judgement condition 3 is not satisfied ("No" at step S27), the dangerous driving detector 25 judges whether or not the judgement condition 4 (see Table 1) is satisfied (step S28). When the judgement condition 4 is satisfied ("Yes" at step S28), the dangerous driving detector 25 detects that the driver of the vehicle 200 performed a dangerous driving by running through the red light (step S29). When the judgement condition 4 is not satisfied ("No" at step S28), the dangerous driving detection processing is ended.

Next, a hardware configuration of the detection apparatus 100 will be explained.

First of all, a hardware configuration of the camera 10 will be explained.

Figure 15:
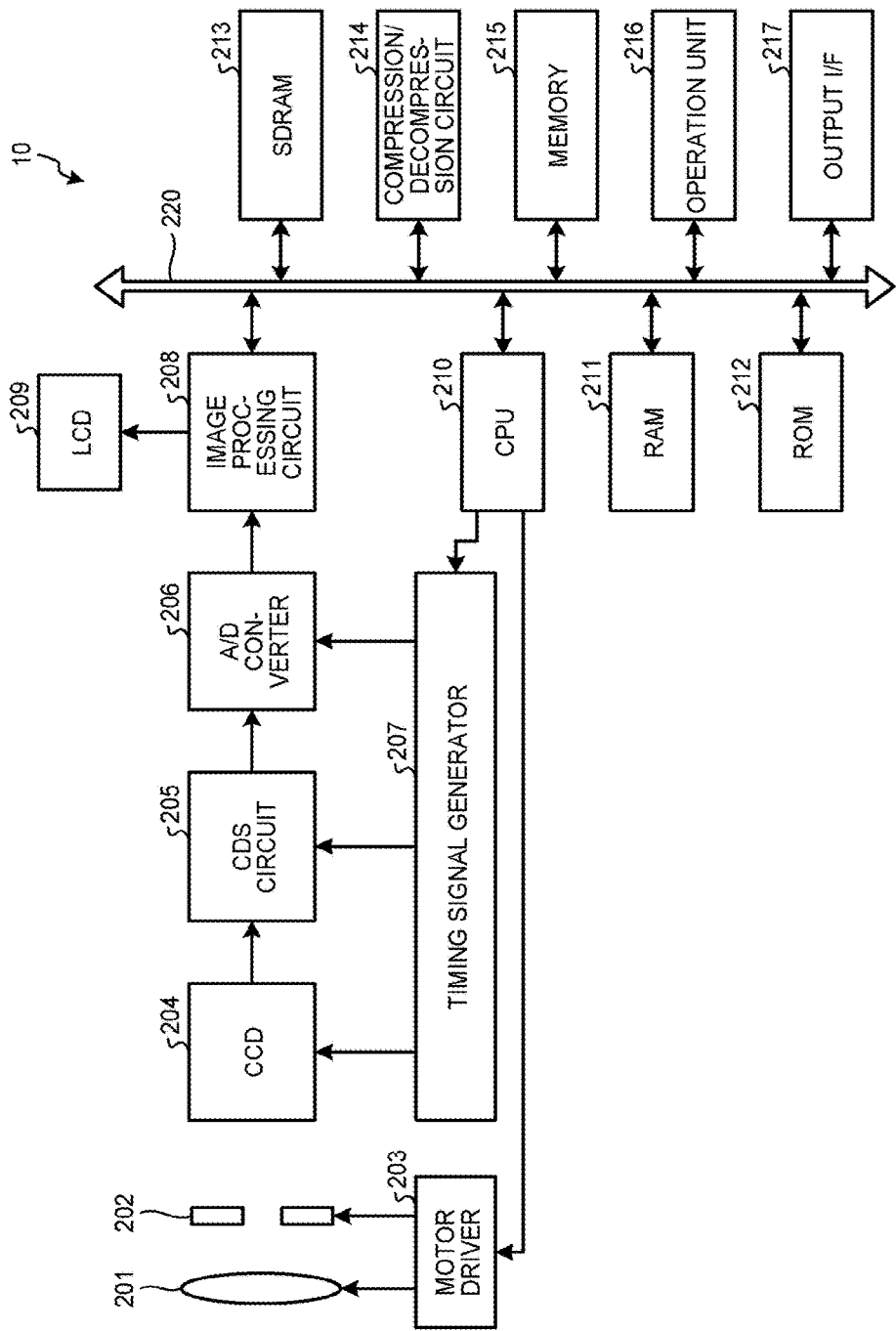
FIG. 15 illustrates an example of a hardware configuration of a camera according to the embodiment.

FIG. 15 illustrates an example of a hardware configuration of the camera 10 according to the embodiment. the camera 10 according to the embodiment is provided with an imaging optical system 201, a mechanical shutter 202, a motor driver 203, a CCD (Charge Coupled Device) 204, a CDS (Correlated Double Sampling) circuit 205, an A/D converter 206, a timing signal generator 207, an image processing circuit 208, an LCD (Liquid Crystal Display) 209, a CPU (Central Processing Unit) 210, a RAM (Random Access Memory) 211, a ROM (Read Only Memory) 212, an SDRAM (Synchronous Dynamic Random Access Memory) 213, a compression/decompression circuit 214, a memory 215, an operation unit 216, and an output I/F 217.

The image processing circuit 208, the CUP 210, the RAM 211, the ROM 212, the SDRAM 213, the compression/decompression circuit 214, the memory 215, the operation unit 216, and the output I/F 217 are connected via a bus 220.

The imaging optical system 201 condenses light reflected by a subject. The mechanical shutter 202 opens for a predetermined period of time to allow the light condensed by the imaging optical system 201 to enter the CCD 204. The motor driver 203 drives the imaging optical system 201 and the mechanical shutter 202.

The CCD 204 forms an image of the subject from the light having entered via the mechanical shutter 202 and inputs analogue image data of the image of the subject to the CDS circuit 205. The CDS circuit 205 eliminates a noise component of the image data when receiving the analogue image data from the CCD 204 and inputs the analogue image data whose noise component is eliminated to the A/D converter 206. The A/D converter 206 converts the analogue image data into digital image data when receiving the analogue image data from the CDS circuit 205. The A/D converter 206 inputs the digital image data to the image processing circuit 208. The timing signal generator 207 transmits a timing signal to the CCD 204, the CDS circuit 205, and the A/D converter 206 depending on a control signal from the CPU 210 to control the timing at which the CCD 204, the CDS circuit 205, and the A/D converter 206 operate.

The image processing circuit 208 uses the SDRAM 213 to perform an image processing on the digital image data when receiving the digital image data from the A/D converter 206. The image processing is, for example, a YCrCb conversion processing, a white balance control processing, a contrast correction processing, an edge emphasis processing, a color conversion processing, and the like. The YCrCb conversion processing is an image processing of converting a data format of the image data into a YCrCb format. The white balance control processing is an image processing of adjusting a color density of the image data. The contrast correction processing is an image processing of adjusting a contrast of the image data. The edge emphasis processing is an image processing of adjusting a sharpness of the image data. The color conversion processing is an image processing of adjusting a hue of the image data.

The image processing circuit 208 inputs the image data on which the image processing explained above is performed to the LCD 209 or the compression/decompression circuit 214. The LCD 209 is a liquid crystal display that displays the image data received from the image processing circuit 208.

The CPU 210 executes programs to control the operation of the camera 10. The RAM 211 is a work area when the CPU 210 executes programs and a storage area which is capable of reading and writing and used for storing data of various kinds. The ROM 212 is a read-only storage area that stores programs and the like to be executed by the CPU 210.

The SDRAM 213 is a storage area that temporarily stores image data as an image processing target when the image processing circuit 208 performs the image processing.

The compression/decompression circuit 214 compresses image data when receiving the image data from the image processing circuit 208. The compression/decompression circuit 214 stores the compressed image data in the memory 215. When receiving image data from the memory 215, the compression/decompression circuit 214 decompresses the image data. The compression/decompression circuit 214 temporarily stores the decompressed image data in the SDRAM 213. The memory 215 stores the compressed image data.

The operation unit 216 receives an operation by a user of the camera 10. The operation unit 216 receives an operation of storing the image data displayed in the LCD 209 in the memory 215, for example. The output I/F 217 is an interface that transmits image data from the camera 10 to the signal processor 20.

The interface unit 22, the recognizer 23, the travelling direction detector 24, and the dangerous driving detector 25 of the signal processor 20 explained with reference to FIG. 2 may be realized by hardware as a signal processing board (signal processing circuit) or by software (program) to be executed by the CPU 210 of the camera 10. Besides, the interface unit 22, the recognizer 23, the travelling direction detector 24, and the dangerous driving detector 25 may be realized by hardware and software in combination.

Programs to be executed in the detection apparatus 100 (CPU 210) according to the embodiment are provided by being recorded in a file of an installable format or of an executable format in a computer-readable recording medium such as a CD-ROM, a memory card, a CD-R, and a DVD (Digital Versatile Disk), as a computer program product.

The programs to be executed in the detection apparatus 100 according to the embodiment may be provided by being stored on a computer connected to a network such as the Internet and downloaded via the network. Besides, the programs to be executed in the detection apparatus 100 according to the embodiment may be provided via a network such as the Internet without being downloaded.

The programs to be executed in the detection apparatus 100 according to the embodiment may be provided by being preloaded in the ROM 212 and the like.

In realizing the interface unit 22, the recognizer 23, the travelling direction detector 24, the dangerous driving detector 25, and the like by the programs to be executed in the detection apparatus 100 according to the embodiment, the interface unit 22, the recognizer 23, the travelling direction detector 24, the dangerous driving detector 25, and the like are realized on the RAM 211 when the CPU 210 reads out from the ROM 211 or the above-explained storage medium and executes the programs.

The signal processor 20 explained with reference to FIG. 2 may not be provided with the acceleration sensor 21 when acceleration data can be obtained from an in-vehicle network such as CAN of the vehicle 200.

As explained so far, the camera 10 obtains image data around the vehicle 200 in the detection apparatus 100 according to the embodiment. The recognizer 23 recognizes an area indicating a light of the traffic signal 300 from the image data. The dangerous driving detector 25 detects that the vehicle 200 runs through the light when the size of the area indicating the light is larger than a first threshold, a distance between the light area and an end of the image data is shorter than a second threshold, and velocity data of the vehicle 200 is higher than a third threshold. It is possible in the detection apparatus 100 according to the embodiment to detect, with high accuracy, a dangerous driving in which a traffic signal is ignored with simpler configuration.

According to the embodiment, there is an advantage in that a dangerous driving in which a light is ignored can be detected with higher accuracy with simpler configuration.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:
1. A detection apparatus comprising:
a camera configured to acquire image data around a vehicle;
a recognizer configured to recognize an area indicating a light of a traffic signal from the image data; and
a first detector configured to detect that the vehicle runs through the light when a size of the area indicating the light is larger than a first threshold, a distance between the area indicating the light and an end of the image data is shorter than a second threshold, and velocity data of the vehicle is higher than a third threshold.

2. The detection apparatus according to claim 1, wherein the first detector is further configured to detect that the vehicle runs through the light when the size of the area indicating the light is larger than the first threshold, the distance between the area indicating the light and the end of the image data is shorter than the second threshold, the velocity data of the vehicle is not more than the third threshold, and acceleration data of the vehicle is higher than a fourth threshold.

3. The detection apparatus according to claim 1, further comprising a second detector configured to detect a travelling direction of the vehicle based on acceleration data of the vehicle, wherein
the recognizer further recognizes an area indicating an arrow light of the traffic signal and
the first detector does not detect that the vehicle runs through the light when the vehicle travels in a direction indicated by the arrow light.

4. The detection apparatus according to claim 1, wherein the end of the image data is one of an upper end, a lower end, a left end, and a right end of the image data.

5. The detection apparatus according to claim 1, further comprising an acceleration sensor configured to acquire acceleration data of the vehicle.

6. The detection apparatus according to claim 1, wherein
the camera acquires the image data of (R, G, B) color space, and
the recognizer converts pixel data of the (R, G, B) color space into image data of (Y, U, V) color space; extracts a light pixel area from the image data of the (Y, U, V) color space based on the image data of the (Y, U, V) color space and (U, V) distribution of light pixels indicating the light, covers each of pixels in the light pixel area with a plurality of pixels to expand the light pixel area into an expanded pixel area, and recognizes a circular pixel area included in the expanded pixel area as the area indicating the light.

7. A detection method comprising:
acquiring image data around a vehicle;
recognizing an area indicating a light of a traffic signal from the image data; and
detecting that the vehicle runs through the light when a size of the area indicating the light is larger than a first threshold, a distance between the area indicating the light and an end of the image data is shorter than a second threshold, and velocity data of the vehicle is higher than a third threshold.

8. A non-transitory computer-readable recording medium with an executable program stored thereon, wherein the program instructs a computer of a detection apparatus provided with a camera that acquires image data around a vehicle to perform:
recognizing an area indicating a light of a traffic signal from the image data; and
detecting that the vehicle runs through the light when a size of the area indicating the light is larger than a first threshold, a distance between the area indicating the light and an end of the image data is shorter than a second threshold, and velocity data of the vehicle is higher than a third threshold.

* * * * *